March 30, 1965   E. EINSTEIN ETAL   3,176,054
INSULATING REFRACTORIES
Filed April 9, 1962
A) Refractory Size Graded Charrable Beads In The Range -4 +150 Mesh
B) -325 Mesh Alumina
C) Tempering Agent
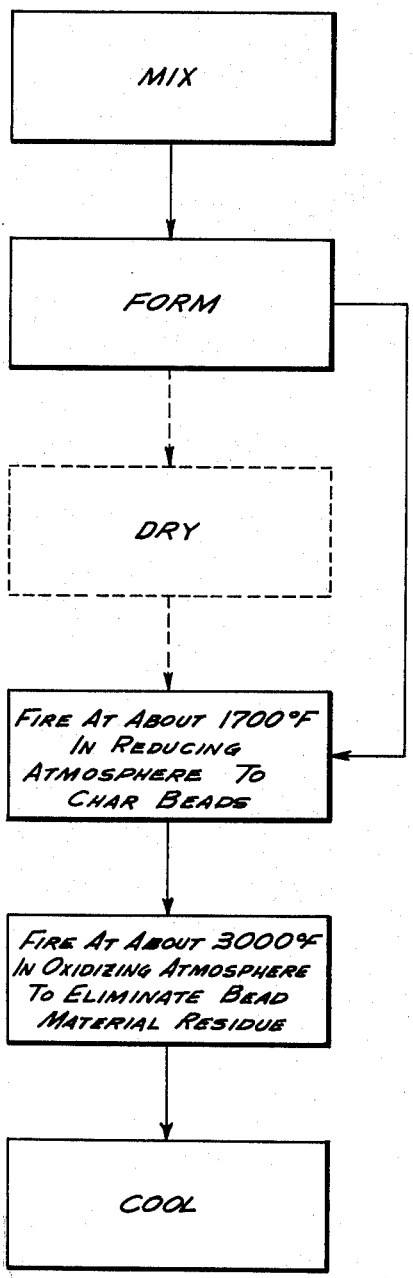
INVENTORS.
EDWARD EINSTEIN &
DONALD O. McCREIGHT
BY.
ATTORNEY

3,176,054
INSULATING REFRACTORIES

Edward Einstein, Homestead, and Donald O. McCreight, Bethel Park, Pa., assignors to Harbison-Walker Refractories Company, Pittsburgh, Pa., a corporation of Pennsylvania
Filed Apr. 9, 1962, Ser. No. 185,877
4 Claims. (Cl. 264—44)

This invention relates to insulating refractories and more particularly to lightweight, porous, refractory, insulating materials and methods of manufacture therefore.

It has been well known and understood in the art that various combustibles can be mixed with unfired refractory material so that, after forming and firing, a porous skeletal structure suited for use as a refractory insulation will result. The combustibles have included various organic materials, both naturally occurring and synthetic. Diatomaceous earth, gas developing materials and foaming agents, fly ash, asbestos, exfoliated pyrophyllite, mica and the like, have also been suggested and utilized in forming a low density lightweight refractory insulation material.

The art is well developed in using the foregoing materials in combination with fireclay and the like and the insulating products which resulted have been satisfactory in many installations despite problems of friability, cracking, and incomplete burnout of combustible materials which sometimes later reacted with process exudate in actual metallurgical installations.

It has been suggested recently that one manner of increasing the solidity of lightweight porous fireclay refractory insulating materials would be to use compressible, blown or foamed plastics.

However, the art apparently has not recognized a method of successfully fabricating a high purity alumina refractory insulation. The various combustibles and other materials which have been incorporated with fireclay and the like do not appear compatible with high purity alumina to produce a satisfactory refractory insulation. For the most part, this is because of residual inclusions which are difficult to remove after an insulating shape has been formed. The residual inclusions are apparently the result of the mass of material which must be used in the original forming in order to obtain the low density porous structure which is desired in a refractory insulation.

Accordingly, it is an object of this invention to provide an improved refractory insulation. Another object of the invention is to provide a method of fabricating improved refractory insulating materials. It is still another object of this invention to provide a lightweight, porous, high purity alumina refractory insulation exhibiting good solidity and handleability with incident ease of packaging and transportation. And it is yet another object of this invention to provide a method of fabricating a lightweight, porous, high purity alumina refractory insulation material which resists expansion and disruption on firing, has better strength, and which is easily made from commercially available raw materials.

In one embodiment, a preferred method of fabricating the insulating refractory material of this invention includes mixing a quantity of −325 mesh (Tyler) high purity alumina and a quantity of hollow, spherical, expanded, rigid plastic beads in a selected brickmaking braded size range. The mixture is preferably blended with water to provide a uniform, smooth, heavy, substantially nonflowing cream-like material. This material is placed in molds and machine-vibrated to orient the rigid plastic beads. The molded material is subjected to a carefully controlled burn including an initial rapid heat to 1700° F. The atmosphere of this 1700° F. heat is lean in oxygen i.e. reducing, whereby the plastic beads are caused to char slowly. The burn is continued at 3000° F. until the charred beads are gasified without disruptions or cracking of the molded material. This 3000° F. burn need not be in a non-oxidizing atmosphere. On a laboratory scale test the 3000° F. burn was for 5 hours. The drawing, which is in flow sheet form, delineates the foregoing process in graphic form.

Preferably, the initial 1700° F. heat is completed in about one hour, but the actual time is controlled by the quantity and rate of charring of the plastic beads, the size of the molded shape, etc. The molds which are used for forming the shapes to be fired are preferably moisture-absorbent and may be such as cardboard or plaster.

Insulating refractory which resulted from the foregoing treatment steps had a thermal conductivity or K factor of about 3 to 4 B.t.u./ft.$^2$/° F. difference for 1″

Table I

| Mix Number | C 3 | C 4 | C 5 | C 6 |
|---|---|---|---|---|
| Mix, percent: | | | | |
| −325 mesh (Tyler), 95+% purity alumina | 58.1 | 63.3 | 67.5 | 63.6 |
| Expandable polystyrene beads (for our use these were expanded; −10 on 20 mesh (Tyler) to a density of 2-4 p.c.f.) | 7.0 | 7.6 | 8.2 | 7.6 |
| Non-expandable polystyrene beads: | | | | |
| 8X | | | 8.1 | 9.6 |
| 60 mesh (Tyler) | 29.1 | 22.8 | 8.1 | 9.6 |
| 100 mesh (Tyler) | | | 8.1 | 9.6 |
| Calcium Aluminate Cement [1] | 5.8 | 6.3 | | |
| | 100.0 | 100.0 | 100.0 | 100.0 |
| Lignin liquor [2] | 6.0 | 6.3 | 6.7 | 6.4 |
| 35% solution of an organic sodium salt in H$_2$O (Used as a dispersing agent)[3] | 1.7 | 1.9 | 2.0 | 1.9 |
| Water | 34.0 | 38.0 | 37.0 | 28.0 |
| "SS Glass," a sodium silicate of the Philadelphia Quartz Company (slow solution) Soda/silica ratio 1/3.22 | | | .34 | |
| "GD Silicate," a sodium silicate of the Philadelphia Quartz Company (fast solution) Soda/silica ratio 1/2.00 | | | | .32 |
| Burn | 3,000° F. burn, 5 hr. hold, reducing conditions to 1,700° F. | | | |
| Bulk Density, p.c.f. | 30 | 30 | 43 | 39 |
| Cold Crushing Strength, p.s.i. | 280 | 180 | 1,050 | 600 |

[1] Such as "Rolandschuette," 52% alumina, less than 1% iron oxide, trace impurities the remainder analyzing SiO$_2$ and CaO on an oxide basis.
[2] Waste liquor of paper industry, used as a tempering fluid.
[3] Such as "Darvan #7" of the R. T. Vanderbilt Company.

thickness. The shapes were strong and substantially uniform textured, and did not exhibit cracking or spalling. In actual laboratory testing, samples exhibited a cold crushing strength of upwards of 1050 p.s.i. The product which resulted was substantially entirely high purity alumina with no apparent residual plastic bead being entrapped.

The preceding table is indicative of actual laboratory testing of comparative mixes according to the concepts of this invention.

The foregoing tests indicated the important nature of proper combinations of graded size ranges for the plastic beads. Note for instance the relatively low strength of Mixes 3 and 4 as compared to Mixes 5 and 6. Therefore, additional tests were undertaken studying the importance of (1) a graded size range for the plastic beads and (2) the sodium silicate additions. The results of these additional tests are set forth in Table II below:

provide about 60 to 70% of the volume of the mix. The other 40 to 30% is made up of the non-expandable beads, tempering fluid, the alumina and sodium silicate.

As discussed above, the initial 1700° F. firing should be relatively rapid. This is because of the very finely divided state of the alumina and the propensity of the skeletal structure, which results after charring out of the beads, to crumble if disturbed. However, by continuing the 1700° F. burn with a 3000° F. burn for about five more hours, the high purity alumina skeletal structure is solidified to produce an insulating refractory of good strength.

The relatively high water content in the initial mix is also important to the successful practice of our invention. It is preferable to add sufficient water to provide a quantity of free water in the mix for molding. The free water is in essence a lubricant which provides fluidity to the otherwise non-flowable mix. Also, the free water assists in allowing more uniform particle orientation during the

*Table II*

| Mix Number | C 7 | C 8 | C 9 | C 10 | C 11 |
|---|---|---|---|---|---|
| Mix, percent: | | | | | |
| Lightly calcined high purity 95+% $Al_2O_3$, −325 mesh (Tyler) | 71.0 | 68.0 | 71.0 | 66.0 | 66 |
| Expandable polystyrene beads (for our use these were expanded to a density of 2–4 p.c.f.) | 4.4 | 8.3 | 4.4 | 4.0 | 4 |
| Non-expandable polystyrene beads | 24.6 | 23.7 | 24.6 | 30.0 | 30 |
| | 100.0 | 100.0 | 100.0 | 100.0 | 100.0 |
| Lignin liquor [1] | 7 | 7 | 7 | 7 | 7 |
| 35% solution of an organic sodium salt in in $H_2O$ (Used as a dispersing agent) [2] | 2 | 2 | 2 | 2 | 2 |
| Water | 37.0 | 35.6 | 37 | 34.5 | 34.5 |
| "GD Silicate," a sodium silicate of the Philadelphia Quartz Company (fast solution) Soda/silica ratio 1/2.00 | | | 0.07 | 0.07 | 0.07 |
| Mold | ([3]) | ([3]) | ([3]) | ([3]) | Plaster |
| Burn | | | 3,000° F., 5 hr. hold, reducing atmosphere to 1,700° F. | | |
| Bulk Density, p.c.f. | 39 | 32 | 42 | 43 | 37 |
| Cold Crushing Strength on Flat, p.s.i. | 535 | 305 | 590 | 640 | 485 |

[1] Waste liquor of paper industry, used as a tempering fluid.
[2] Such as "Darvan #7" of the R. T. Vanderbilt Company.
[3] Cardboard.

In the tests of Table II, the expandable polystyrene beads were in the range of 10 on 20 mesh (Tyler), and were substantially all hollow. A workable size range is −4 on 35 mesh (Tyler). The non-expandable polystyrene beads used in our tests were −28+100 to 150 mesh (Tyler). While the finer non-expandable beads were not hollow, the coarser ones were.

In the exemplary laboratory data set forth above, we mention polystyrene beads as beads usable according to the concepts of this invention. It should be understood that other plastic materials in bead form can be utilized. However, any selected bead material must be substantially rigid, must be in a good, graded brickmaking size range to provide the necessary aggregate base for the very finely divided high purity alumina so that it may be molded and cast. The beads which are used should substantially all be spherical and hollow. The spherical shape and hollowness are important aspects of the successful practice of our invention, in that a large surface area is presented with but little weight, assuring ease of complete removal of the bead material, and to provide substantially uniform distribution of pores, upon firing. As noted above, some of the finer beads were not hollow. These solid beads should be kept to a minimum, and in the finer size ranges to be tolerable, in order to assure complete removal on firing.

In the laboratory data above, we discuss a mixture of expandable and expanded beads. However, it should be understood that the expandable beads, before mixing with the alumina, have been pre-expanded to produce a stable rigid structural entity.

The expanded beads which are substantially all hollow, vibration step of the molding. However, we have fabricated satisfactory insulating refractory from a mixture which was dried after mixing and forming but before firing.

Having thus described our invention in detail and with sufficient particularity as to enable those skilled in the art to practice it, what we desire to have protected by Letters Patent is set forth in the following claims.

We claim:

1. That method of fabricating lightweight, porous refractory insulating shapes, which comprises the steps of; mixing a batch of 3 ingredients, a first ingredient constituting the major portion, by weight, of said batch and being very finely divided −325 mesh alumina; a second batch ingredient being charrable bead-like material consisting of relatively coarse but stable structural entities −4+35 mesh in size, the third batch ingredient being fine charrable bead-like material in the range −28+150 mesh, said −4+35 mesh bead-like material constituted from 60 to 70%, by volume, of the batch, the remaining 30 to 40%, by volume, of the batch being the −28+150 mesh bead material and the alumina, adding sufficient tempering liquid to the batch to provide a formable mixture, forming the resulting mixture into shapes, subjecting the shapes to an initial burn in a non-oxidizing atmosphere to a temperature of about 1700° F. to char the bead-like material, and then to a subsequent burn at a higher temperature for a time sufficient to gasify and remove all of the bead-like material without disruption and cracking of the shapes.

2. That method of fabricating lightweight, porous refractory insulating shapes, which comprises the steps of; mixing a batch of 3 ingredients, a first ingredient constituting the major portion, by weight, of said batch and being very finely divided alumina; a second batch ingredient being charrable bead-like material consisting of relatively coarse but stable structural entities −4+35 mesh in size, the third batch ingredient being fine charrable bead-like material in the range −28+150 mesh, said −4+35 mesh bead-like material constituted from 60 to 70%, by volume, of the batch, the remaining 30 to 40%, by volume, of the batch being the −28+150 mesh bead material and the alumina, the alumina constituting 60 to 70%, by weight, of the batch, adding sufficient tempering liquid to the batch to provide a formable mixture, forming the resulting mixture into shapes, subjecting the shapes to an initial burn in a non-oxidizing atmosphere to char the bead-like material, and then to a subsequent burn at a higher temperature for a time sufficient to gasify and remove all of the bead-like material without disruption and cracking of the shapes.

3. That method of fabricating lightweight, porous refractory insulating shapes, which comprises the steps of; mixing a batch of 3 ingredients, a first ingredient constituting the major portion, by weight, of said batch and being very finely divided alumina; a second batch ingredient being charrable bead-like material consisting of relatively coarse but stable structural entities −4+35 mesh in size, the third batch ingredient being fine charrable bead-like material in the range −28+150 mesh, said −4+35 mesh bead-like material constituted from 60 to 70%, by volume, of the batch, the remaining 30 to 40%, by volume, of the batch being the −28+150 mesh bead material and the alumina, the alumina constituting 60 to 70%, by weight, of the batch, adding 0 to 1%, by weight, of a water soluble sodium silicate, adding sufficient tempering liquid to the batch to provide a formable mixture, forming the resulting mixture into shapes, subjecting the shapes to an initial burn in a non-oxidizing atmosphere to char the bead-like material, and then to a subsequent burn at a higher temperature for a time sufficient to gasify and remove all of the bead-like material without disruption and cracking of the shapes.

4. That method of fabricating lightweight, porous refractory insulating shapes, which comprises the steps of; mixing a batch of 3 ingredients, a first ingredient constituting the major portion, by weight, of said batch and being very finely divided refractory material; a second batch ingredient being charrable bead-like material consisting of relatively coarse but stable structural entities −4+35 mesh in size, the third batch ingredient being fine charrable bead-like material in the range −28+150 mesh, said −4+35 mesh bead-like material constituted from 60 to 70%, by volume, of the batch, the remaining 30 to 40%, by volume, of the batch being the −28+150 mesh bead material and the refractory, adding sufficient tempering liquid to the batch to provide a formable mixture, forming the resulting mixture into shapes, subjecting the shapes to an initial burn in a non-oxidizing atmosphere to char the bead-like material, and then to a subsequent burn at a higher temperature for a time sufficient to gasify and remove all of the bead-like material without disruption and cracking of the shapes.

References Cited by the Examiner

UNITED STATES PATENTS

| | | | |
|---|---|---|---|
| 350,921 | 10/86 | Dudley | 106—65 |
| 2,242,434 | 5/41 | Norton | 25—156 |
| 2,251,687 | 8/41 | Norton | 25—156 |
| 2,360,929 | 10/44 | Blaha. | |
| 2,399,225 | 4/46 | Heany | 106—65 |
| 2,996,389 | 8/61 | Fernhof | 106—71 |

FOREIGN PATENTS 1,126,302  3/62  Germany.

ROBERT F. WHITE, *Primary Examiner.*

MORRIS LIEBMAN, ALEXANDER H. BRODMERKEL, *Examiners.*